2,888,490
PREPARATION OF ALPHA-HALOALKYL ETHERS

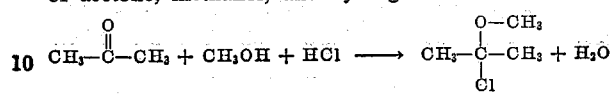

Ned Foster Walter, Lake Jackson, Rolland Mayden Waters, Freeport, and John Malcolm Lee, Lake Jackson, Tex., assignors to The Dow Chemical Company, Midland, Mich., a corporation of Delaware No Drawing. Application July 11, 1957
Serial No. 671,119

4 Claims. (Cl. 260—614)

This invention relates to a process for the preparation of alpha-haloalkyl ethers, and more particularly, to the preparation of alpha-haloalkyl ethers by the reaction of a ketone, alcohol, and a hydrogen halide.

Alpha-haloalkyl ethers have been prepared by the reaction of aldehyde, alcohol, and hydrogen halide. The preparation of a corresponding alpha-haloalkyl ether by a similar reaction using a ketone instead of an aldehyde has not heretofore been successful. In many reactions ketones and aldehydes react similarly due to the carbonyl group. However, this reaction is one of the exceptions to this general similarity in the reactivity of aldehydes and ketones. The alpha-haloalkyl ethers obtained with ketones differ from those obtained with aldehydes in that the alpha carbon atom has an alkyl group attached to it instead of a hydrogen. These alpha-haloalkyl ethers with an alkyl radical attached to the alpha atom are very unstable compounds and will readily hydrolyze to an alcohol and ketone. Consequently, attempts to prepare these ethers by the reaction of an alcohol, ketone, and hydrogen halide have been heretofore unsuccessful. They have been prepared by chlorination of ketals with phosphorus trichloride. The preparation of ketal is difficult. Thus, a process where alpha-haloalkyl ethers can be prepared by the reaction of a ketone, alcohol, and hydrogen halide is greatly desirable.

It is, therefore, a principal object of this invention to provide a process for the preparation of alpha-haloalkyl ethers of the type having an alkyl radical attached to the alpha carbon. A further object is to provide a process for the preparation of these alpha-haloalkyl ethers by the reaction of a ketone, alcohol, and a hydrogen halide.

The above and additional objects are accomplished by intermixing an unsubstituted saturated monohydric alcohol having from 1 to 2 carbon atoms, a ketone having a general formula:

$$CH_3-\overset{O}{\underset{}{C}}-R$$

where R is a member of the group consisting of alkyl, chloroalkyl, bromoalkyl, and alkoxy radicals having from 1 to 2 carbon atoms, and a gaseous hydrogen halide having a molecular weight in the range of 36 to 81 at a temperature in the range of —20° to the freezing point of the resulting mixture. These reactants are intermixed in proportions such that the molar ratio of the alcohol to ketone is in the range of 1:0.8 to 1:1.2 and the amount of hydrogen halide is in the range of a stoichiometric proportion to a 500 percent stoichiometric excess. At these low temperatures, the reactants intermixed in the above proportions react to form an alpha-haloalkyl ether.

In a co-pending application No. 579,943, filed April 23, 1956 and now Patent Number 2,837,575, by Waters and Lee, co-inventors in the instant application, a process is disclosed where ketals may be prepared by reacting an alcohol and ketone in the presence of mineral acids, preferably halogen acids. It has now been discovered that at low temperatures alpha-haloalkyl ethers may be prepared by the reaction of alcohol, ketone, and hydrogen halide. The reaction effected may be illustrated by the following equation showing the reaction of acetone, methanol, and hydrogen chloride:

$$CH_3-\overset{O}{\underset{}{C}}-CH_3 + CH_3OH + HCl \longrightarrow CH_3-\underset{\underset{Cl}{|}}{\overset{\overset{O-CH_3}{|}}{C}}-CH_3 + H_2O$$

Theoretically one mole each of the three reactants is necessary for the reaction. Although it is preferred to use approximately stoichiometric amounts of each of the three reactants, a ratio of alcohol to ketone in the range of 1:0.8 to 1:1.2 may be used. A large excess of alcohol will promote the formation of ketal and thus reduce the yields of the alpha-haloalkyl ether obtained. Likewise, a large excess of ketone is not desirable as it promotes condensation reactions of the ketone. The amount of hydrogen halide used is not as critical as the ratio of alcohol to ketone. It may be increased to about a 500 percent stoichiometric excess without obtaining any appreciable deleterious effect.

Aliphatic saturated ketones having three to four carbon atoms may be used. In addition to the unsubstituted ketones, such as acetone and methyl ethyl ketone, halogen substituted and methoxy substituted ketones, such as chloroacetone, methoxyacetone, bromoacetone, and chloromethyl ethyl ketone may also be employed. The alcohols used are the unsubstituted saturated monohydric alcohols having up to 2 carbon atoms, such as methanol and ethanol. With hydrogen chloride or hydrogen bromide, alpha-chloroalkyl ethers or alpha-bromoalkyl ethers, such as 1,2-dichloro-2-methoxypropane, 1,2-dibromo-2-methoxypropane, 2-chloro-2-methoxybutane, 2-dichloro-2-ethoxypropane, and 2-chloro-1, 2-dimethoxypropane may be prepared.

While a reaction temperature as high as —20° C. and as low as a freezing point of the mixture may be used, a temperature in the range of —55° to —65° C. is preferred. Since the reaction in the formation of the alpha-haloalkyl ethers is reversible, small amounts of the alpha-haloalkyl ether are obtained at temperatures above —20° C. High temperatures shift the equilibrium favoring the reverse reaction.

Due to the reverse reaction, it is preferred to separate the alpha-haloalkyl ether from the reaction mixture at the reaction temperature. The alpha-haloalkyl ether formed may be readily separated from the reaction mixture by extracting it from the reaction mixture with a volatile saturated hydrocarbon, such as petroleum ether. In contacting the reaction product with a volatile saturated hydrocarbon, the alpha-haloalkyl ether is selectively dissolved in the hydrocarbon forming a hydrocarbon phase which is relatively free of the other constituents of the reaction mixture. Generally, the amount of hydrocarbon solvent used is around 2 to 10 times the volume of the reaction mixture. With a continuous countercurrent extraction process, substantially all of the alpha-haloalkyl ether may be extracted using a volume of the hydrocarbon solvent equal to 2 to 5 times the volume of the reaction product. In a simple single contact extraction process, a larger amount of the solvent is required and the volume used is from 5 to 10 times the reaction mixture. The alpha-haloalkyl ether may be recovered from the hydrocarbon phase by flashing off the volatile hydrocarbon under vacuum. Although the alpha-haloalkyl ether when removed from the reaction mixture may be maintained in the hydrocarbon phase at temperatures up to 0° C. for considerable length of time without decomposing, it is preferred to remove the hydrocarbon by flash distillation at a temperature of —10° C. or below.

The rate of reaction of the alcohol, ketone, and hydrogen halide is relatively rapid. Generally in a batch process the alcohol and ketone are intermixed and gaseous hydrogen halide is bubbled into the mixture. The hydrogen halide may be introduced as rapidly as cooling can be effected to maintain the desired low reaction temperature. When a continuous process is used, the ketone and alcohol are charged into a properly cooled tower to which the hydrogen halide is also introduced. The effluent from reaction tower is immediately passed into an extraction column where the alpha-haloalkyl ether is separated from the reaction mixture.

While it is not critical to maintain totally anhydrous conditions, it is preferred to maintain the water concentration in the reaction mixture at a minimum. Water is formed by the reaction and the presence of additional water only increases the rate of the reverse reaction. Thus to maintain this reverse action at a minimum, the reaction is initiated with relatively water-free reactants.

*Example*

To a three-neck flask equipped with an agitator, a thermometer and a gas delivery tube, 110 ml. (1.5 gm. moles) of acetone and 61 ml. (1.5 gm. moles) of methanol were added. The mixture was cooled to —65° C. Gaseous hydrogen chloride metered through a rotometer was passed into the mixture at a rate such that the mixture could be sufficiently cooled to maintain the contents of the flask at approximately —65° C. It required about 1¾ hours to add 1.5 moles of hydrogen chloride.

After the addition of the hydrogen chloride, 20 ml. of the reaction mixture was contacted with 100 ml. of petroleum ether cooled to a temperature of —60° C. to extract the 2-chloro-2-methoxypropane from the reaction mixture. Two phases were obtained, a hydrocarbon phase containing the major part of the 2-chloro-2-methoxypropane and a non-hydrocarbon phase containing the other constituents of the reaction mixture. The phases were separated and the non-hydrocarbon phase was again contacted with an additional 100 ml. of petroleum ether. The resulting two phases were again separated and the hydrocarbon phase from the first contact was combined with the hydrocarbon phase obtained in the second contact and analyzed by infrared. It was found to contain 3.13 gm. of 2-chloro-2-methoxypropane.

The 2-chloro-2-methoxypropane is separated from the hydrocarbon solvent by flashing off the hydrocarbon solvent under a vacuum, such as 4 mm. of Hg absolute pressure at which pressure the 2-chloro-2-methoxypropane has a boiling point of —12° C.

In the manner similar to that above, hydrogen bromide may be substituted for hydrogen chloride and ethanol for methanol. Also in place of acetone, methyl ethyl ketone, chloroacetone, methoxyacetone, and chloromethyl ethyl ketone may be used.

What is claimed is:

1. A process for the preparation of an alpha-haloalkyl ether by the reaction of an alcohol, ketone, and hydrogen halide, which comprises intermixing an unsubstituted saturated monohydric alcohol having from 1 to 2 carbon atoms, a ketone having the general formula:

$$\mathrm{CH_3-\overset{\overset{O}{\|}}{C}-R}$$

where R is a member of the group consisting of alkyl, chloroalkyl, bromoalkyl, and alkoxy radicals having from 1 to 2 carbon atoms, and a gaseous hydrogen halide having molecular weight in the range of 36 to 81 in proportions such that the molar ratio of the alcohol to ketone is in the range of 1:0.8 to 1:1.2 and the amount of hydrogen halide is in the range of a stoichiometric proportion to a 500 percent stoichiometric excess at a temperature in the range of —20° C. to the freezing point of the resulting mixture thereby to react the alcohol, ketone, and hydrogen halide to form an alpha-haloalkyl ether contacting the resulting mixture with a volatile saturated hydrocarbon at a temperature in the range of —20° C. to the freezing point of the resulting mixture to extract the alphahaloalkyl ether in a hydrocarbon phase from the other constituents of the resulting mixture remaining in a non-hydrocarbon phase, separating the hydrocarbon phase from the non-hydrocarbon phase, and distilling the hydrocarbon phase under vacuum to separate the alpha-haloalkyl ether from the hydrocarbon phase.

2. A process for preparation of an alpha-haloalkyl ether by the reaction of an alcohol, ketone, and hydrogen halide, which comprises intermixing an unsubstituted saturated monohydric alcohol having from 1 to 2 carbon atoms, a ketone having the general formula:

$$\mathrm{CH_3-\overset{\overset{O}{\|}}{C}-R}$$

where R is a member of the group consisting of alkyl, chloroalkyl, bromoalkyl, and alkoxy radicals having up to 2 carbon atoms, and a gaseous hydrogen halide having a molecular weight in the range of 36 to 81 in equimolar proportions at a temperature in the range of —55° to —65° C. thereby to react the alcohol, ketone, and hydrogen halide to form the alphahaloalkyl ether, contacting the resulting mixture with a volatile saturated hydrocarbon in a proportion of from 2 to 10 times the volume of resulting mixture at the reaction temperature to extract the alpha-haloalkyl ether in a hydrocarbon phase from the other constituents remaining in a non-hydrocarbon phase, separating the hydrocarbon phase from the non-hydrocarbon phase, and distilling the hydrocarbon phase under vacuum at a temperature below —10° C. to separate the alpha-haloalkyl ether from the hydrocarbon phase.

3. A process for the preparation of 2-chloro-2-ethoxypropane which comprises intermixing ethanol, acetone, and gaseous hydrogen chloride in equimolar proportions at a temperature in the range of —55° to —65° C. thereby to react the ethanol, acetone, and hydrogen chloride to form the 2-chloro-2-ethoxypropane, contacting the resulting mixture with a volatile saturated hydrocarbon in a proportion of from 2 to 10 times the volume of resulting mixture at the reaction temperature to extract the alphahaloalkyl ether in a hydrocarbon phase from the other constituents remaining in a non-hydrocarbon phase, separating the hydrocarbon phase from the non-hydrocarbon phase, and distilling the hydrocarbon phase under vacuum at a temperature below —10° C. to separate the alpha-haloalkyl ether from the hydrocarbon phase.

4. A process for preparation of 2-chloro-2-methoxypropane, which comprises intermixing methanol, acetone, and gaseous hydrogen chloride in equimolar proportions at a temperature in the range of —55° to —65° C. thereby to react the methanol, acetone, and hydrogen chloride to form the 2-chloro-2-methoxypropane, contacting the resulting mixture with a volatile saturated hydrocarbon in proportions of from 2 to 10 times the volume of the resulting mixture at a temperature in the range of —55° to —65° C. to extract the 2-chloro-2-methoxypropane formed in a hydrocarbon phase from the other constituents of the resulting mixture remaining in a non-hydrocarbon phase, separating the hydrocarbon phase from the non-hydrocarbon phase, and distilling the hydrocarbon phase under vacuum to separate the 2-chloro-2-methoxypropane from the hydrocarbon phase.

References Cited in the file of this patent
UNITED STATES PATENTS
2,133,735    Waterman et al. _____ Oct. 18, 1938